April 26, 1938.                B. W. JONES                    2,115,109
                              BEARING REMOVER
                           Filed Sept. 24, 1936          2 Sheets-Sheet 2
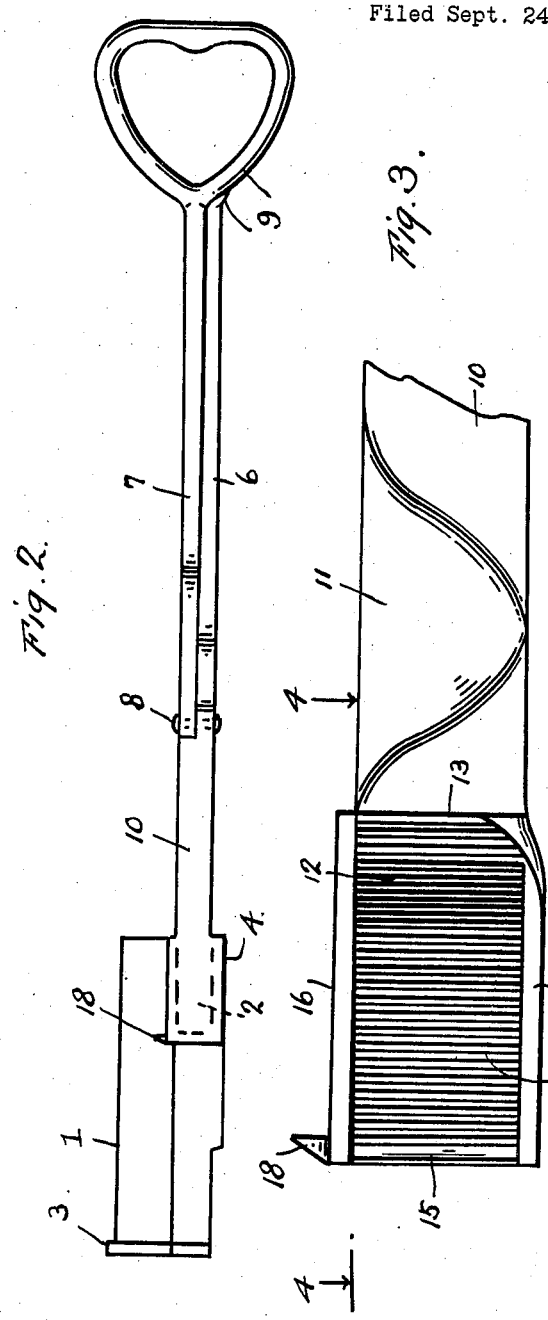
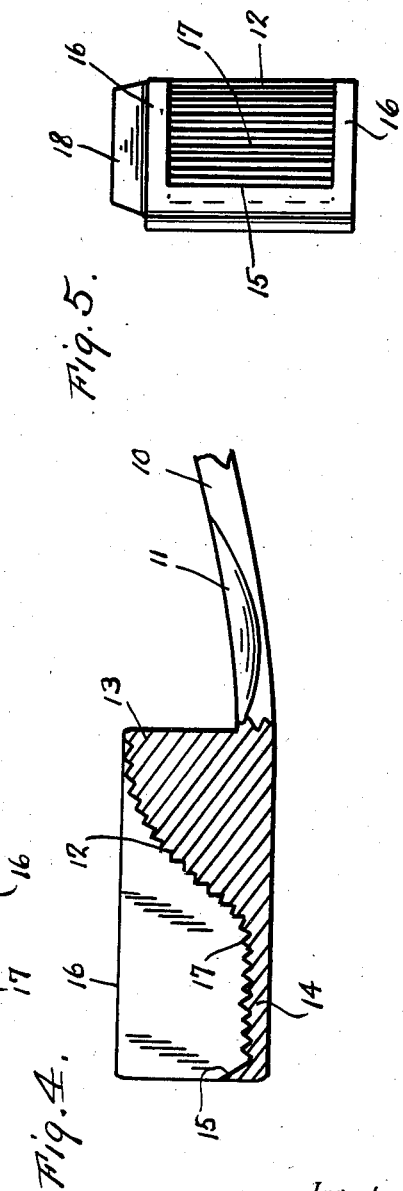
Inventor
B. W. Jones
By Clarence A. O'Brien
Hyman Berman
Attorneys Patented Apr. 26, 1938

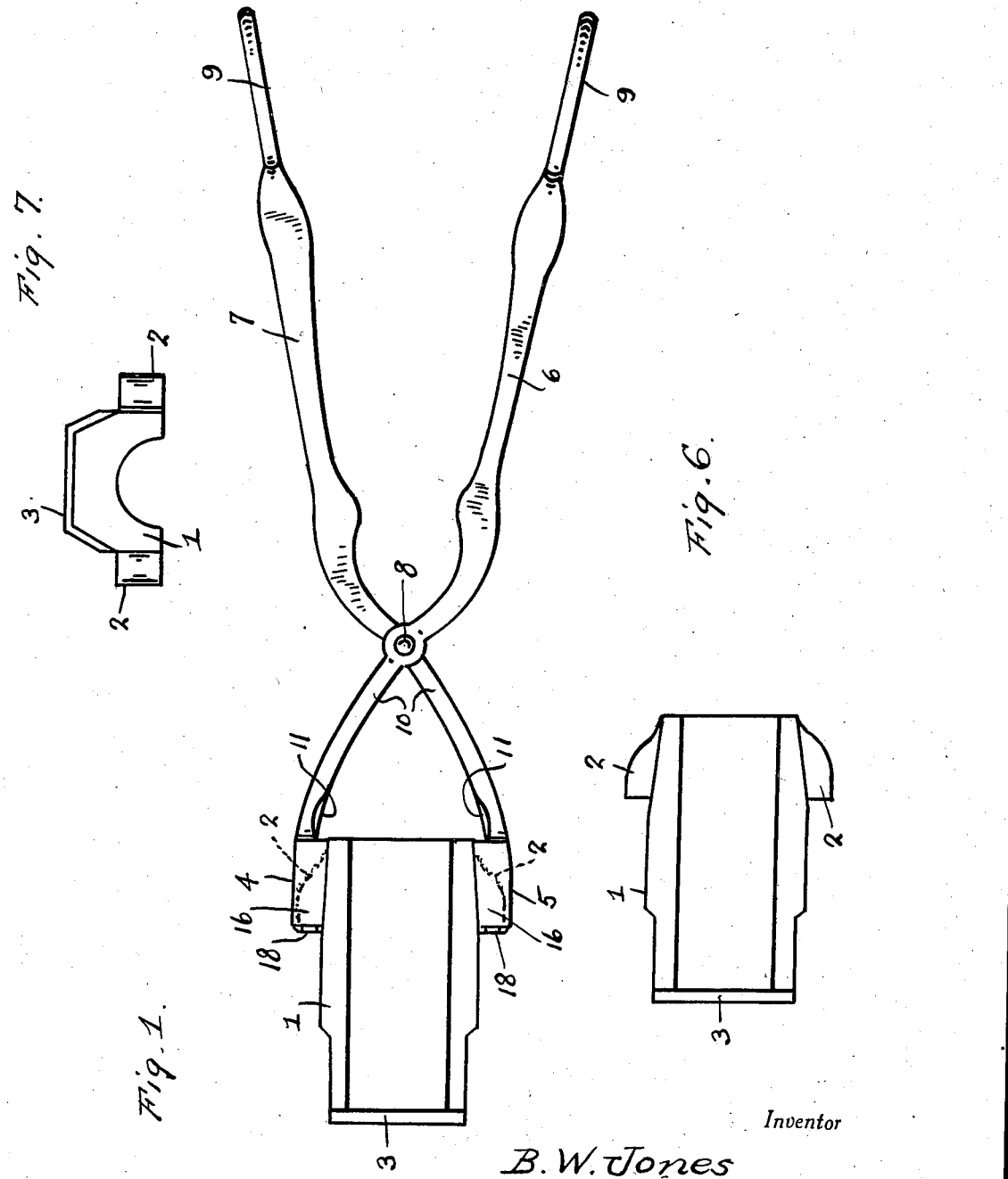

2,115,109

UNITED STATES PATENT OFFICE 2,115,109

BEARING REMOVER

Bert W. Jones, North Adams, Mass.

Application September 24, 1936, Serial No. 102,382

3 Claims. (Cl. 29—88.2)

This invention relates to a device for removing journal bearings from journal boxes and particularly is adapted to be used in railway works for removing 5 x 9 split journal bearings from box car journals.

The removal of journal bearings from journal boxes in the railway industry is a hazardous undertaking, especially for car repairmen or inspectors called out on a rush job to replace loose bearings or to install a new one in a stalled train. The removal of the bearing is generally attempted, after elevation of the car by jacks or blocking, by passing the hands into the journal box to seize and remove the bearings or endeavoring to "hook it out" by means of a packing hook or any other serviceable tool or device that is available. Should the jacks or blocking "kick out" or collapse under the weight of a heavily loaded car while the repairman is busy removing the bearing from the journal which is not an infrequent occurrence, there is grave danger of the repairman being seriously injured and maimed by the weight of the car coming down upon and crushing his hands against the collar of the journal.

The object of the present invention is to provide a hand tool by means of which car journal bearings can be removed in a simple and expeditious manner and without subjecting the repairman to hazards above described.

With this object in view the invention resides in the novel construction, arrangement, and combination of parts hereinafter described and pointed out in connection with the accompanying drawings, wherein:—

Figure 1 is a bottom plan view showing the bearing remover applied to a top journal bearing unit.

Figure 2 is a side view of the parts shown in Figure 1.

Figure 3 is an enlarged detail view of one of the jaws of the tool.

Figure 4 is a section on line 4—4 of Figure 3 and

Figure 5 is an end view of the jaw.

Figure 6 is a bottom plan view of the top unit of a split railway car journal bearing of a type to which the remover is especially applicable, and Figure 7 is a front end view of the bearing shown in Figure 6.

A typical half of a 5 x 9 split journal bearing as shown at 1, is provided with side lugs 2 which fit tight against lugs on the inside of the journal box (not shown), a circular collar coming up over the front end of the bearing. The rear end of the bearing usually has a raised rib 3.

The bearing remover constituting the invention comprises a pair of coacting jaws 4 and 5 having crossed arms or levers 6 and 7 pivotally connected at 8 and having substantially large heart-shaped hand grips 9 for moving the handles to open and close the jaws. The hand grips 9 are disposed in planes at right angles to the plane of the lever arms and provide ample room for the gloves or mittens worn by the repairman in cold weather so that they will not have to be removed in using the tool. The bowed or jaw carrying portion 10 of the lever arms are each hollowed out at the butt of the jaws as shown at 11 to provide clearance for the aforementioned collar of the car journal when the jaws of the bearing removing tools are engaged over the bearing lugs as shown in Figure 1.

The jaws 4 and 5 are shaped, as shown in Figures 3 and 4, to conform to the side contour of the bearing side lugs 2, for which purpose the face of the jaw slopes forwardly and outwardly as at 12 from a thick cross-section 13 at the butt end of the jaw to a relatively narrow cross-section 14, which narrow cross-section is substantially maintained to the outer end of the jaw or up to an inwardly directed wedge-shaped tooth 15 at the extreme end of the jaw. The face of each jaw 4, 5 is provided for its full width with serrations, or teeth, 17 for biting into the bearing lugs 2. Each jaw face is enclosed for its full length by a pair of side flanges 16 integral with the related lever 6, or 7, as the case may be, the flanges 16 of each jaw extending toward those of the other into the space defined by said levers to receive the lugs 2 therebetween. Each jaw 4, 5, at the front end thereof extends to the full height of the enclosing flanges 15 and slopes gradually downwardly and inwardly between the flanges to provide the relatively narrow cross section 14 extending forwardly from the median point of the jaw to the wedge-shaped tooth 15. The tooth 15, or projection, extends across the free end of the jaw and is of less height than the height of the flanges 16. On top of one flange of each jaw and at the extreme end of the jaw is an integrally formed horn 18. These horns may be used to pull out the journal bearing wedges preparatory to removing the bearing.

In using the device to remove a bearing the forward open ends of the jaws are aligned with the bearing lugs and the tool pushed in over the lugs until the wedge-shaped jaw teeth 15 drop in back of the lugs. If lugs on bearings are tight against lugs on inside of journal box and prevent jaw teeth 15 from dropping in back of bearing lugs, the lever arms are moved to close the jaws firmly on the lugs to hold the bearing in a tight grip and then lifted up and pulled out a trifle to separate the bearing lugs from the journal box lugs. The grip of the jaws is then loosened and the latter are pushed further in along the bearings until the jaw teeth 15 drop in place back of the bearing lugs. Upon the closing of the jaws, teeth 15 by reason of their wedge-shape exert an outward thrust on the bearing lugs and force the bearing outwardly until the jaws close firmly and snugly on the bearing lugs with the jaw serrations 17 biting into the said lugs. The tool is then drawn outwardly to fully remove the bearing from the journal.

Having thus described the invention what is claimed is:—

1. A tool for removing split car journal bearings of the side lug type which consists of crossed and pivotally connected levers having coacting jaws at one end and hand grips at the opposite end for moving the levers to open and close the jaws, each of said jaws including a serrated jaw face on its inner side and enclosed between parallel side flanges integral with the corresponding lever and projecting into the space defined between the levers, said jaw extending the full height of the flanges at the front end of the jaw and sloping gradually downwardly and inwardly between the flanges to provide a relatively narrow cross section extending from a median point of the jaw forwardly to the outer end thereof with an inwardly directed tooth of wedge-shape at the extreme outer end of the face to bear against and exert an outward thrust on the bearing as the jaws are closed against the same.

2. A tool of the class described comprising a pair of elongated members pivotally connected together and each having a jaw at one end and a handle at the other end, each jaw comprising an elongated member extending longitudinally of the device and having a pair of parallel flanges at its side edges, each flange having a flat inner face and said flanges forming a space to receive an object to be gripped, the flanges of the two jaws extending toward each other and a tooth forming projection at the free end of each jaw and extending across the space between the flanges, said projections being of less height than the height of the flanges and each projection being of the same height from end to end.

3. A tool of the class described comprising a pair of elongated members pivotally connected together and each having a jaw at one end and a handle at the other end, each jaw comprising an elongated member extending longitudinally of the device and having a pair of parallel flanges at its side edges, each flange having a flat inner face and said flanges forming a space to receive an object to be gripped, the flanges of the two jaws extending toward each other and a tooth forming projection at the free end of each jaw and extending across the space between the flanges, said projection being of less height than the height of the flanges and each projection being of the same height from end to end, the bottom wall of the jaw being substantially flat from a point starting at the inner side of the said projection to a point intermediate the ends of the jaw, from which point the bottom wall curves outwardly on its inner side until it becomes of substantially the same thickness as the height of the flanges at the butt end of the jaw.

BERT W. JONES.